United States Patent [19]

Ying et al.

[11] Patent Number: 4,623,464
[45] Date of Patent: Nov. 18, 1986

[54] REMOVAL OF DIOXINS, PCB'S AND OTHER HALOGENATED ORGANIC COMPOUNDS FROM WASTEWATER

[75] Inventors: Wei-chi Ying, Grand Island; Stanley A. Sojka, Buffalo, both of N.Y.

[73] Assignee: Occidental Chemical Corporation, Niagara Falls, N.Y.

[21] Appl. No.: 714,436

[22] Filed: Mar. 21, 1985

[51] Int. Cl.⁴ .............................................. C02F 3/08
[52] U.S. Cl. .................................... 210/616; 210/626; 210/631; 210/909
[58] Field of Search ............... 210/616, 631, 626, 627, 210/909, 620, 624, 617, 694, 667

[56] References Cited

U.S. PATENT DOCUMENTS

| | | | |
|---|---|---|---|
| 4,168,228 | 9/1979 | Mallat et al. | 210/631 |
| 4,237,002 | 12/1980 | Strudgeon et al. | 210/631 |
| 4,271,013 | 6/1981 | Bhattacharyya | 210/626 |
| 4,292,176 | 9/1981 | Grutsch et al. | 210/631 |

FOREIGN PATENT DOCUMENTS 57-136993  8/1982  Japan .................................. 210/631

OTHER PUBLICATIONS

Chem. Abstr., vol. 101:59561r, "Enhanced Biological Treatment of Leachates from Industrial Landfills", (1984).
Randall, T. L., "Wet Oxidation of PACT Process Carbon Loaded with Toxic Compounds", Proc. of the 38th Ind. Waste Conf. Purdue Univ., pp. 323-338 (1983).
Cormack, J. W. et al., "A Pilot Study for the Removal of Priority Pollutants by the PACT Process", Proc. of the 38th Ind. Waste Conf. Purdue Univ., pp. 403-415 (1983).

Primary Examiner—Benoît Castel
Attorney, Agent, or Firm—Peter F. Casella

[57] ABSTRACT

Combinations of physicochemical and biological treatment processes are capable of removing dioxins, polychlorobiphenyls (PCB's) and other halogenated organic compounds from wastewaters. The dioxins and PCB's are removed by at least 90 percent in the pretreatment steps of neutralization, oxidation, and sedimentation; the residual amounts are removed in a powdered activated carbon enhanced sequencing batch reactor (PAC-SBR) operating at a high mixed liquor suspended solids concentration (>5000 mg/L). Powder activated carbon (PAC) is supplemented to the bioreactor to ensure complete removal of the dioxins (<0.8 ppt) and PCB's (<2 ppb).

The PAC-SBR enhanced biological treatment process is capable of meeting stringent effluent limits on not only on dioxins and PCB's but also on other toxic halogenated organic compounds. The treatment cost of this process is substantially less than either the conventional granular activated carbon adsorption technology or two stage treatment of biodegradation and carbon absorption.

5 Claims, 1 Drawing Figure

REMOVAL OF DIOXINS, PCB'S AND OTHER HALOGENATED ORGANIC COMPOUNDS FROM WASTEWATER

BACKGROUND OF THE INVENTION

Since World War II the chemical industry has grown to the point where there are over 35 million metric tons of hazardous wastes being generated. Large quantities of these wastes contain synthetic halogenated materials such as found in dielectric fluids, flame retardants, refrigerants, heat transfer fluids, lubricants, protective coatings, pesticides, and herbicides. Furthermore, it is well known that both the petroleum industry and the coal industry contribute many more millions of metric tons of hazardous chemical wastes to be disposed of which contain obnoxious organic compounds. Many of these materials are non biodegradable or recalcitrant, i.e., difficult to biodegrade.

Among the most hazardous and toxic of materials known to man are the dioxins. The most toxic of these materials is represented by the formulation of 2,3,7,8-tetrachlorodibenzo-p-dioxin (TCDD). They are a hazard in land, water or air, no matter where, and are the most controlled toxic substance under Federal, State, and Municipal laws. Regulating the dioxins are subject to a no detection limit, and the detection limit of dioxins is presently 2 parts per trillion (ppt). Dioxins are created out of any number and variety of materials primarily as by-products in other manufacture of chemicals such as insecticides, e.g. 245T, biocides such as hexachlorophene, chlorobiphenols, and by incineration of halogenated organic wastes. Polychlorobiphenyls (PCB's) are also subject to stringent limits generally less than 2 parts per billion (ppb). The PCB's are introduced into the environment as a result of their use in electrical equipment. The dioxins and PCB's are by far the most difficult toxic material to remove and destroy. They are, for all intensive purposes, non-biodegradable.

Landfills have been used as disposal sites for as much as 80 percent of the hazardous waste, out of the 35 million tonnes per year, which are under Federal Regulation in the estimated 270 landfills in the United States. Many of these contain dioxins and PCB's. When they are present, with other hazardous chlorinated organic compounds, they find their way into the leachates which are formed over the course of time by a process of liquifaction the contents of the landfill.

These leachates must be collected and treated to meet the standard set by the Federal, State, and Municipal laws to make them environmentally acceptable for disposal in the ecosphere.

Various methods and techniques have been proposed and used for disposing of and/or treating leachates or chemical wastewaters containing dioxins, PCB's and related products to make them compatible with the environment. Among the processes or technologies either proposed or employed are incineration on land and at sea, plasma arc, biodegradation, chemical dechlorination, ion exchange, filtrations of various kinds, electrolysis, carbon/resin adsorption, pyrolysis, molten salt bed reactors among others. In spite of all the effort and money being spent, no technology has evolved which is both economically and technically satisfactory for removing dioxins, PCB's and other recalcitrant chlorinated organic compounds from wastewater so it may be discharged into streams, rivers, lakes, or the sea without contamination of such bodies of water.

The present state-of-the-art for treating chemical process wastewaters and chemical landfill leachates containing dioxins and PCB's involves employing a series of process steps whch are difficult to manage and/or operate economically with results that meet the stringent effluent restrictions imposed by Federal and State law.

Accordingly, it is an object of this invention to provide a new and improved process for removing dioxins, PCB's and other chlorinated organic chemical compounds from leachates and chemical wastewaters in an economical and efficient manner to produce an effluent which has less than 2 ppt dioxins and 2 ppb PCB's and is acceptable in the ecosphere.

BRIEF DESCRIPTION OF THE INVENTION

This invention relates to new and improved processes for treating leachates and wastewaters containing dioxins, PCB's and other recalcitrant halogenated organic compounds to render them acceptable in the natural environment without adverse effects and in an efficient and economical manner. More particularly, this invention relates to an improvement in the method for treating chemical process wastewaters and chemical waste landfill leachates containing dioxin, PCB's and other hazardous halogenated organic compounds, by the process which comprises combination of physicochemical and biological treatment processes for removing dioxins, PCB's and other hazardous recalcitrant halogenated organic compounds from wastewater, which comprises the physiochemical process of subjecting the wastewater to equalization and their simultaneous neutralization and oxidation, followed by separation of precipitated products, which have absorbed major proportion of the dioxin and PCB of the raw wastewater in the same pretreatment zone, and then followed by a biological treatment process consisting of subjecting the so treated wastewater, which contains the minor proportion of the dioxin and PCB's and other halogenated compounds in wastewater, to a combined carbon adsorption and biological treatment process, to produce an effluent free of dioxin and PCB's and substantially free of other halogenated organic compounds.

The simultaneous neutralization and oxidation causes precipitation of metal hydroxides which in turn adsorb a portion of the other organic pollutants in the wastewater being processed in accordance with our invention. The precipitate so formed is then separated from the treated liquid. The wastewater so treated is sent to a powered activated carbon (PAC) enhanced biological treatment zone where substantially all the biodegradable organic constituents of the wastewater are removed. The dioxins, PCB's and other halogenated organic compounds which are recalcitrant, non-biodegradable and deleterious to the ecosphere, are removed by the unique combination and sequence of adding powdered activated carbon to the FILL and/or REACT steps of the sequencing batch reactor (SBR) process which is employed in accordance with our invention.

THE PRIOR ART

Processes for treating chemical wastewater and chemical landfill leachates are of course known and practiced in industry in order to comply with the municipal, state and federal laws governing the discharge of wastes. The 1972 Water Pollution Control Act (PL 92-500), which was amended in 1977 as the Clean Water Act (PL 95-217), required the U.S. Environmental Protection Agency (EPA) to set standards in 1984 on the control of effluents for conventional parameters such as chemical oxygen demand (COD), biochemical oxygen demand (BOD) as well as for a large number of priority (toxic) pollutants including many halogenated organic compounds. Accordingly, many new technologies have been proposed for complying with these new standards.

The present state-of-the-art for treating chemical landfill leachates is described by W. J. McDougall, R. A. Fusco, and R. P. O'Brien, in "Containment and Treatment of the Love Canal Landfill Leachate" in Journal Water Pollution Control Federation, Vol. 52, pg. 2914–2924 (1980).

An overview and assessment of biological treatment systems relative to their overall applicability to industrial processing waste streams which discusses the various processes which may be considered including enzyme treatment, activated sludge, trickling filter, aerated lagoon, waste stabilization pond, anaerobic digestion and composting is given by Sandra L. Johnson in "Unit Operations for Treatment of Hazardous Wastes" (1978), pg. 168–217 published by Noyes Data Corporation.

A review of physiochemical carbon adsorption process may be found in an article by Wei-chi Ying and Walter J. Weber, Jr. entitled "Bio-physiochemical Adsorption Systems Model", Journal Water Pollution Control Federation, Vol. 51, pg. 2661–2677 (1979).

Addition of PAC to the aeration tank of an activated sludge system for improving the treatment efficiency and comparison of the PAC enhanced biological treatment with the two stage biodegradation and carbon adsorption were given in an article by C. G. Grieves, L. W. Crame, D. G. Vernardo and Wei-chi Ying, entitled "Powdered Versus Granular Carbon for Oil Refinery Wastewater Treatment"—Journal Water Pollution Control Federation, Vol. 52, pg. 483–497 (1980).

A recent development in the biological treatment of wastewater designated as SBR is reported by R. L. Irvine, and A. W. Bush in "Sequencing Batch Biological Reactors—An Overview" in Journal Water Pollution Control Federation, Vol. 51, No. 2, pg. 235–304 (1980).

Most recently, U.S. Pat. No. 4,477,570 issued Oct. 16, 1984, which is owned by the common assignee of this application, discloses the biodegradation of halogenated organic chemicals employing new found life forms.

Copending application, Ser. No. 381,866 filed May 24, 1982, which is also owned by the common assignee of this application and in which one of the present applicants is a co-inventor discloses the use of the new life forms described in U.S. Pat. No. 4,477,570 as innoculants in biological wastewater treatment systems.

U.S. application for patent Ser. No. 714,435 filed on even date herewith in the names of the present applicants with another coapplicant discloses and claims a method for treating process wastewaters and waste landfill leachates to remove the objectionable contaminants to produce a liquid discharge capable of being assimilated in the natural environment without adverse effects comprising equilization, neutralization, oxidation, and a carbon adsorption treatment zone to produce a discharge acceptable to the natural environment. However, it does not provide the improvement in the process of this invention of introducing powdered activated carbon during the FILL and/or REACT steps of the sequencing batch reactor process as will be more fully described hereinafter.

These and many other processes have been proposed for treating chemical wastewaters and/or chemical landfill leachates to make them compatible with the natural environment; however, they either involve expensive and complicated techniques which are time consuming and inefficient or do not remove dioxins, PCB's and other recalcitrant halogenated organic compounds to the level provided by this invention.

In order that our invention may be more readily understood, we shall describe it with respect to FIG. 1 and the following specific embodiments and examples; however, it shall be understood that we do not intend to be limited thereby, except as defined in the appended claims.

DESCRIPTION OF PREFERRED EMBODIMENT

Figure 1:
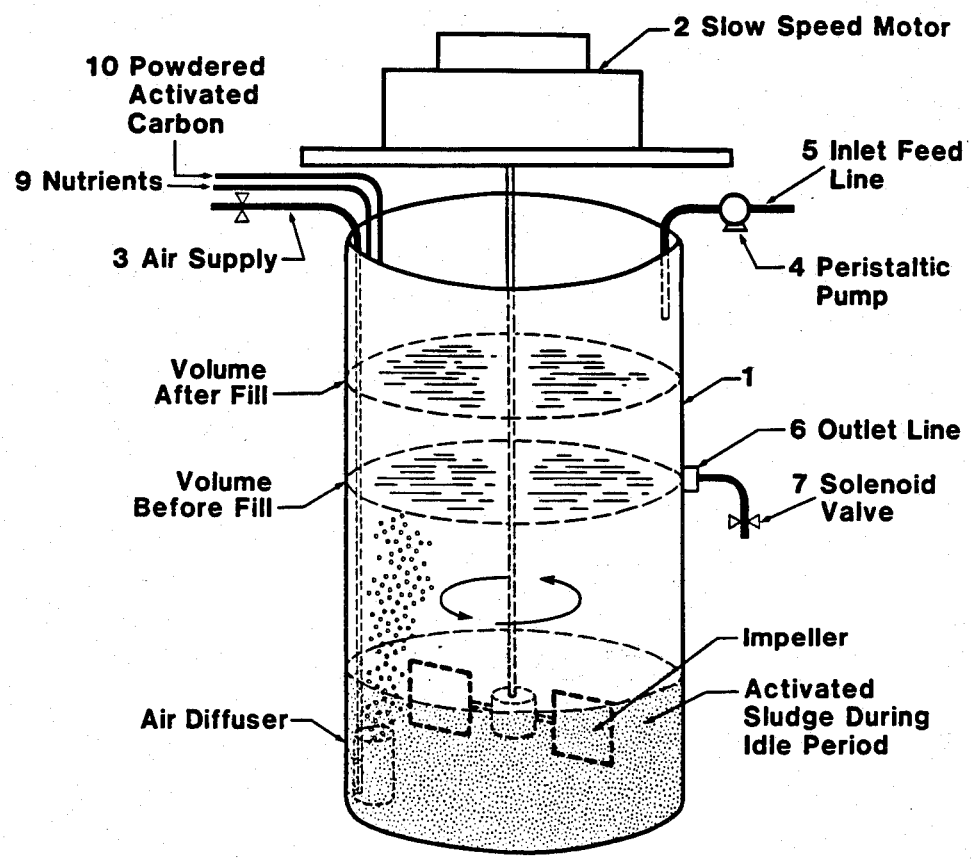
FIG. 1 is a schematic diagram of a powdered activated carbon enhanced sequencing batch reactor.

Referring to the FIGURE the reactor (1) is shown as a cylindrical tank fitted with a slow speed agitator (2). A peristaltic pump (4) is installed in the inlet feed line (5) to the reactor (1). The reactor is provided with an outlet (6), and solenoid valves (7) are provided at the outlet (6) and in the air supply line (3). Timers (8) are provided to control the pump (4), the motor (2), air supply (3), and outlet line (6). Nutrients (9), that is, ammonia, phosphate, and/or others as determined for optimum biodegradation of the wastewater are added either as chemicals or solutions during FILL and/or REACT. Powdered activated carbon (10) which improves the treatment efficiency and which is critical in producing an effluent free of dioxins and PCB's is added in either dry or slurry form during FILL and/or REACT.

The PAC-SBR system may be composed of one or more such tanks and in biological waste treatment, each tank in the system has five basic operating modes and periods, each of which is named according to its primary function. The periods are FILL, REACT, SETTLE, DRAW, and IDLE, in a time sequence. FILL (the receiving of raw waste) and DRAW (the discharge of treated effluent) must occur in each complete cycle for a given tank, REACT (the time to complete desired reactions), SETTLE (the time to separate the organisms from the treated effluent), and IDLE (the time after discharging the tank and before refilling) can be eliminated depending on requirements of the treatment problem. For example, if a PAC-SBR system were being used for equalization only, each cycle might only involve FILL and DRAW.

The time for a complete cycle is the total time between beginning of FILL to end of IDLE in a single-tank system and between beginning of FILL for the first reactor (arbitrarily defined) and the end or IDLE for the last reactor in a multiple-tank system. In a multiple-tank system, the reactors FILL in sequence, the criterion being that one reactor must have completed DRAW prior to another completing FILL.

EXAMPLE I

Several batches of aqueous leachate from a chemical landfill in Niagara Falls, N.Y., having a composition which includes organic compounds and halogenated organic compounds as exemplified in Table 1 were introduced into the equalization zone consisting of a 2000-L storage vessel. The combined leachate is maintained in a quiescent condition until a substantially uniform aqueous phase is formed. The supernatant was analyzed and found to have characteristics as shown in Table 2.

400 liters of said leachate were introduced into a pretreatment zone consisting of a 500-L plastic tank equipped with inlets for leachate feed, air, and chemicals, and outlets for pretreated leachate, air, and sludge, an a mechanical mixer. Concentrate sodium hydroxide solution was added to this 400 liters of leachate while the mixer was operating and until the pH was equal to 7.5; this caused precipitates to be formed. Air was introduced through the air inlet to this body of leachate over the course of two hours, and this caused oxidation and more precipitates to be formed. After the immediate chemical oxygen demand was satisfied, air and mixing were stopped, and separation of precipitates by sedimentation was allowed. The composition of the pretreated leachate is also given in Table 2.

The sludge produced in the pretreatment zone was periodically removed and disposed of in a secure landfill. The pretreated leachate was then transferred to the treatment zone consisting of eight parallel 1-L reactors each equipped with inlets for pretreated leachate feed, air, nutrients, and powdered activated carbon, and a mechanical mixer and processed in accordance with the powdered activated carbon enhanced sequencing batch reactor (PAC-SBR) process description given above.

The wastewater was fed, and solutions of nutrients ($NH_4Cl$ and $KH_2PO_4$) were added, during FILL, to the reactors containing a mixture of powdered activated carbon and acclimated activated sludge, which was originally obtained from a nearby publicly owned treatment works (Wheatfield, N.Y. 14304), from the previous cycle. Aeration and mechanical mixing were provided while feeding and/or subsequently during REACT to enhance the rate of aerobic biodegradation. After the mixed liquor was biologically stabilized as indicated by small oxygen utilization rate, slurry of powdered activated carbon was added, and then after about 10 minutes, air and mixing were stopped. Clarification took place in the SETTLE step. During DRAW, the clear supernatant was withdrawn from the reactor. The SBR cycle was either repeated immediately or the reactor was kept in IDLE until the FILL time in the next cycle. The operating and cycle schedules are described in Table 3, and the effluent compositions are given in Table 4. The PAC-SBR treated leachates, which met the existing discharge limits as shown in Table 5, were discharged to a sanitary sewer.

EXAMPLE II

The adsorptive capacity of powdered activated carbons for dioxin was compared to that of inorganic precipitates produced in the pretreatment zone (precipitate) and mixed liquor suspended solids of a sequencing batch bioreactor (biomass). Table 6 shows that PAC A had significantly more capacity for dioxins than PAC B, which was far better than either the precipitate or biomass. Table 7 shows that PAC A was responsible for the removal of dioxins, PCB's and other halogenated organic compounds. The expected cost savings over a ten year period in treating a chemical landfill leachate employing the process of this invention is given in Table 8.

The five PAC-SBR steps are often overlapped, and one or two steps may be omitted in a particular treatment cycle. The withdrawal of effluent may start as soon as a clear zone of supernatant is formed, and the wastewater feeding may begin immediately after the completion of the DRAW step of the last SBR cycle. The required nutrients are either supplemented to the feed or added directly to the bioreactor. The sludge wasting is accomplished by removing a portion of the settled sludge in the DRAW or IDLE step. The optimum SBR operating and cycle schedules must be experimentally established for a wastewater to achieve the specific treatment objectives. The excess biomass was also periodically removed and disposed of in a secure landfill.

The wastewaters which will be treated in accordance with our invention may vary widely in their composition and make-up. For example, the process of this invention specifically exemplified in the foregoing example. In addition this invention allows for treatment of chemical wastewaters directly emanating from chemical manufacturing operations such as petroleum, food processing, and other industrial plants issuing waste pollutants.

The biological treatment techniques that may be employed in accordance with our inventions other than the sequencing batch technique, includes variations of the continuous activated sludge processes. Furthermore, the process of this invention lends itself to being used as a supplement to the municiple wastewater treatment plants that must handle wastewaters from industrial sources. In the foregoing specific example of our invention which illustrates a preferred embodiment, we may employ several other adsorbents other than activated carbon, such as activated alumina, molecular sieves, etc. It should be understood that, although we have emphasized the treatment of wastewater containing significant quantity of halogenated organic compounds, our invention should not be construed as limited to only removing or minimizing the amount of these compounds because of our integrated treatment process not only removes these recalcitrant and obnoxious compounds to acceptable limits, but also at the same time eliminates less recalcitrant and undesirable compounds, such as oil, grease, fats, and hydrocarbon in general.

The foregoing detailed description has been given to enable an understanding of our invention; however, we do not intend to be limited to the exact details or the specific examples for many obvious modifications will occur to those skilled in art.

TABLE 1

Compilation of Organic Compounds Typically Found In Chemical Waste Landfills

| Empirical Formula | Compound Name |
|---|---|
| $C_7H_7Cl$ | Chloromethylbenzene (isomer) |
| $C_9H_{12}$ | C-3 Alkylbenzene |
| $C_6H_4Cl_2$ | Dichlorobenzene isomer |
| $C_8H_{11}$ | 2,4-Dimethyl-3-Hexanone |
| $C_{10}H_{14}$ | C-4 Alkylbenzene |
| $C_7H_6Cl_2$ | Dichlorotoluene isomer |
| $C_7H_{14}O$ | 2,2-Dimethyl-3-Propyloxirane |
| $C_4Cl_6$ | Hexachlorobutadiene |
| $C_6H_3Cl_3$ | Trichlorobenzene isomer |
| $C_{11}H_{24}$ or $C_{16}H_{34}$ | Saturated Hydrocarbon |
| $C_{12}H_{24}O_2$ | Undecanoic Acid Methylester |
| $C_7H_5Cl_3$ | Trichlorotoluene isomer |
| $C_8H_7O_2Cl$ | Methylester Chlorobenzoic Acid isomer |
| $C_6H_2Cl_4$ | Tetrachlorobenzene isomer |

TABLE 1-continued
Compilation of Organic Compounds Typically Found In Chemical Waste Landfills

| Empirical Formula | Compound Name |
|---|---|
| $C_{10}H_{23}ON$ | O—Decyl-Hydroxylamine |
| $C_{10}H_{21}Cl$ | 1-Chlorodecane |
| $C_6H_2Cl_4$ | Tetrachlorobenzene isomer |
| $C_{12}H_{10}$ | 1,1-Biphenyl |
| $C_{12}H_{10}O$ | 1,1-Oxybis-Benzene |
| $C_{11}H_{24}$ | Undecane |
| $C_7H_4Cl_4$ | Tetrachlorotoluene isomer |
| C-9 or C-12 | Branched Saturated Hydrocarbon |
| $C_{10}H_{10}O_3$ | Beta-Oxo-Benzenepropanoic Acid Methylester |
| $C_8H_{18}O_2$ | 1,3-Hexanediol-2-Ethyl |
| $C_8H_{18}O$ | 1-Propoxypentane |
| $C_9H_{18}$ | 3,4,5-Trimethyl-1-Hexene |
| $C_{14}H_{14}$ | 1,1-Ethylidene-Benzene |
| $C_{14}H_{14}$ | 1,1-Biphenyl-2-Ethyl |
| $C_{10}H_{21}Cl$ | 1-Chlorodecane |
| $C_{15}H_{32}$ | 2,5-Dimethyltridecane |
| $C_{16}H_{34}$ | Hexadecane |
| $C_{13}H_{16}O_2$ | Cyclohexylbenzoic Acid Ester |
| $C_{12}H_{14}O_4$ | Diethylester 1,2-Benzenedicarboxylic Acid |
| $C_5H_2Cl_6$ | Hexachlorocyclopentadiene |
| $C_{10}H_{11}OCl$ | 1-(4-Chloropheny)-1-Butanone |
| $C_{14}H_{29}Cl$ | 1-Chlorotetradecane |
| $C_7H_{14}O$-50 | 3-Methylcyclohexanol |
| $C_5H_{10}O_2$ | Tetrahydropyran-2-ol |
| $C_{14}H_{10}$ | Phenanthrene |
| $C_{10}H_{12}O_2S$ | 3-Phenylmethylthio Propanoic Acid |
| $C_{20}H_{10}O$ | 1-Ethenyloxy-Octadecane |
| $C_7H_2Cl_6$ | 1,2,3,4,7,7-Hexchloro Bicyclo-2,2,1-hepta-2,5-diene |
| $C_{14}H_{12}$ | 1,1-Ethenylidene bis benzene |
| $C_{18}H_{37}Cl$ | 1-Chlorooctadecane |
| $C_{16}H_{22}O_4$ | Butyl-2-Methylpropyl Ester 1,2-Benzenedicarboxylic Acid |
| $C_7H_8S$ | Benzene Methanethiol |
| $C_{14}H_{14}S$ | 1,1-Thiobis(methylene)bis-Benzene |
| $C_{14}H_{10}Cl_2$ | 1,2-Bis(p-Chlorophenyl)Ethylene |
| $C_{10}H_{22}O$ | 2,2-Dimethyl-1-Octanol |
| $C_6H_9OCl$ | 3-Chlorobenzene Ethanol |
| $C_{14}H_{22}O_3$ | 2,2,2-Triethoxyethyl-Benzene |
| $C_{24}H_{38}O_4$ | Diisooctylester-1,2-Benzenedicarboxylic Acid |

TABLE 2
Characteristics of Typical Raw and Pretreated Hyde Park Leachates

| Parameter[a] | Raw Leachate | Pretreated Leachate[b] |
|---|---|---|
| pH | 4.3 | 7.5 |
| Total organic carbon (TOC) | 3500 | 3200 |
| Chemical oxygen demand (COD) | 10040 | 9200 |
| Biological oxygen demand | 7500 | 7200 |
| Suspended solids (SS) | 900 | 80 |
| Volatile suspended solids | 300 | 40 |
| Total dissolved solids | 25700 | 22400 |
| Orthophosphate phosphorus | <1 | <1 |
| Acid-hydrolyzable phosphorus | 3 | 3 |
| Total phosphorus | 131 | 92 |
| Ammonia nitrogen | 150 | 130 |
| Total kjeldahl nitrogen | 180 | 160 |
| Nitrate nitrogen | 20 | 20 |
| Nitrite nitrogen | <5 | <5 |

[a] All values, except pH, are given in mg/L.
[b] Pretreatment consisted of neutralization with NaOH to a pH of 7.5, two hours of aeration, and two hours or longer of settling.

TABLE 3
Examples of PAC-SBR Operating and Cycle Schedules

PAC-SBR Units
600 ml working volume, 24-hour cycle,
4-day hydraulic retention time (25% daily feeding)

| Operating Schedule | 1C | 3A | 3B | 4A | 4B | 6A | 6B | 6C |
|---|---|---|---|---|---|---|---|---|
| Wastewater feed | | | | (pretreated leachate) | | | | |
| Sterilization of feed | | | | (no) | | | | |
| Bacterial supplementation | | | | (no) | | | | |
| Mixed liquor biological suspended solids, mg/L | 10000 | | | (10000[a]) | | | | |
| Mixed liquor PAC, mg/L | 0 | 3000 | 3000 | 4500 | 4500 | 6000 | 6000 | 6000 |
| PAC inventory, g | 0 | 1.8 | 1.8 | 2.7 | 2.7 | 3.6 | 3.6 | 3.6 |
| PAC dose, g/day | 0 | 0.09 | 0.18 | 0.135 | 0.27 | 0.18 | 0.18 | 0.36 |
| Mixed liquor wasting, ml/day | [b] | 30 | 60 | 30 | 60 | 30 | 30 | 60 |
| Time per SBR cycle, hour | | | | | | | | |
| FILL (air & mixing) | | | | (6[c]) | | | | |
| REACT (air & mixing) | | | | (14) | | | | |
| SETTLE | | | | (3) | | | | |
| DRAW | | | | (0.25[d]) | | | | |
| IDLE | | | | (0.75) | | | | |

[a] Initial value at the begining of PAC-SBR study; it gradually declined with the daily wasting of mixed liquor. The steady state mixed liquor biological solids concentration was dependent on the feed concentration and daily wasting volume.
[b] The mixed liquor wasting volume of the control unit was calculated based on new measurement of the MLSS to maintain a nominal concentration of 10000 mg/L.
[c] The PAC-SBR units were fed twice, 12.5% of working volume each time, at the begining and the end of FILL.
[d] Effluent discharge was accomplished using a 100-ml pipet.

TABLE 4
Results of PAC-SBR Treatment of Leachate[a]

| PAC-SBR sample | TOC | TOX[b] | HET acid | Phenol | Benzoic acid | m-CBA[c] | p-CBA |
|---|---|---|---|---|---|---|---|
| | | | | (mg/L) | | | |
| Feed | 3570 | 440 | 150 | 820 | 1160 | 130 | 160 |
| 1C effluent | 286 | 196 | 102 | 3 | 6 | 20 | 16 |
| 3A effluent | 207 | 141 | 80 | <1 | 4 | 5 | 9 |
| 3B effluent | 179 | 114 | 77 | <1 | 2 | 4 | 7 |

TABLE 4-continued

Results of PAC-SBR Treatment of Leachate[a]

| PAC-SBR sample | TOC | TOX[b] | HET acid | Phenol (mg/L) | Benzoic acid | m-CBA[c] | p-CBA |
|---|---|---|---|---|---|---|---|
| 4A effluent | 207 | 130 | 80 | <1 | 2 | 10 | 8 |
| 4B effluent | 143 | 83 | 51 | <1 | 2 | 5 | 5 |
| 6A & B effluent[d] | 179 | 106 | 71 | <1 | 2 | 3 | 7 |
| 6C effluent | 121 | 55 | 63 | <1 | 2 | 2 | 3 |

[a]Samples were taken at the end of the program.
[b]TOX = total organic halides
[c]CBA = chlorobenzoic acid.
[d]Average of the duplicate units.

TABLE 5

Discharge Limits of Final Effluent

| PARAMETERS | MAXIMUM CONCENTRATION[a] |
|---|---|
| pH | 5–10 |
| Phenol | 1 mg/L |
| TOC (excluding Methanol) | 300 mg/L |
| or | |
| TOC (total) | 1000 mg/L |
| Trichloroethylene | 10 µg/L |
| Tetrachloroethylene | 10 µg/L |
| Monochlorobenzene | 10 µg/L |
| Monochlorotolene | 10 µg/L |
| Benzene | 10 µg/L |
| Trichlorobenzenes | 10 µg/L |
| Tetrachlorobenzenes | 10 µg/L |
| Monochlorbenzotrifluoride (chloro-2,2,2-trichlorotoluene) | 10 µg/L |
| Hexachlorocyclobutandiene (C-46) | 10 µg/L |
| Hexachlorocylopentadiene (C-56) | 10 µg/L |
| Hexachlorocyclohexanes (C-66) | 10 µg/L |
| 2,4,5-Trichlorophenol | 10 µg/L |
| Endosulfan | 10 µg/L |
| Mirex | 1 µg/L |
| 2,3,7,8-Tetrachlorodibenzo-p-dioxin | Not Dectectable |

[a]Except for pH

TABLE 6

Adsorption Isotherms for TCDD[a]

| Concentration (µg/L) | Capacity (mg TCDD/g) | Concentration (µg/L) | Capacity (mg TCDD/g) |
|---|---|---|---|
| PAC A | | PAC B | |
| 15.6 | 2.8 | 8.8 | 1.6 |
| 5.0 | 1.2 | 7.2 | 0.52 |
| 3.6 | 0.86 | 4.8 | 0.23 |
| 2.4 | 0.47 | 2.0 | 0.08 |
| 0.25 | 0.059 | 1.2 | 0.06 |
| SBR Biomass | | Pretreatment Precipitates | |
| 12.8 | 0.0056 | 20.0 | 0.0034 |
| 10.0 | 0.0047 | 16.8 | 0.0024 |
| 8.0 | 0.0040 | 11.4 | 0.0018 |
| 6.8 | 0.0034 | 7.7 | 0.0009 |
| 3.6 | 0.0029 | | |

[a]Based on the concentration of $^{14}$C-TCDD in a 2.5-ml test tube after four hours of contact with the test adsorbent; initial concentration = 24 ppb.

TABLE 7

Removal of Dioxins, PCB's and Halogenated Organic Compounds in PAC-SBR Units

| PAC-SBR Sample | TCDD[a] (ppt) | PCB's[b] | Trichloro-benzenes | C-56 | 2,4,5 Tri-chlorophenol (ppb) | Endosulfan | Mirex |
|---|---|---|---|---|---|---|---|
| 1C effluent | 1.5 | 9 | 68 | 37 | 39 | 51 | 26 |
| 3A effluent | ND$_{0.8}$[c] | ND$_2$ | ND$_{10}$ | ND$_{10}$ | ND$_{10}$ | ND$_{10}$ | ND$_1$ |
| 3B effluent | ND$_{0.8}$ | ND$_2$ | ND$_{10}$ | ND$_{10}$ | ND$_{10}$ | ND$_{10}$ | ND$_1$ |
| 4A effluent | ND$_{0.8}$ | ND$_2$ | ND$_{10}$ | ND$_{10}$ | ND$_{10}$ | ND$_{10}$ | ND$_1$ |
| 6C effluent | ND$_{0.8}$ | ND$_2$ | ND$_{10}$ | ND$_{10}$ | ND$_{10}$ | ND$_{10}$ | ND$_1$ |

[a]2,3,7,8-TCDD and coeluting isomers.
[b]Arocolor-1248.
[c]ND$_x$ = Not detected at a detection limit of x ppt or ppb.

TABLE 8

Expected Saving in Treatment Cost with PAC-SBR Process

| Time Period (months) | Flowrate (m³/d) | TOC[a] Loading | Carbon[b] Usage (kg/d) | Carbon[c] Saving | Cost Saving[d] $/d | $1000/yr |
|---|---|---|---|---|---|---|
| 1 thru 6 | 95 | 142 | 991 | 961 | 1590 | 580 |
| 7 thru 12 | 295 | 215 | 1442 | 1399 | 2313 | 844 |
| 13 thru 18 | 250 | 202 | 1361 | 1320 | 2183 | 796 |
| 19 thru 24 | 144 | 170 | 1170 | 1135 | 1877 | 685 |
| 25 thru 30 | 144 | 170 | 1170 | 1135 | 1877 | 685 |
| 31 thru 36 | 144 | 170 | 1170 | 1135 | 1877 | 685 |
| 37 thru 120 | 144 | 170 | 1170 | 1135 | 1877 | 685 |

10-Year Average Saving $693,700/year

[a]The first 68 m³/d at 1700 mg TOC/L; the next 45 m³/d at 1000 mg TOC/L; the rest at 300 mg TOC/L.
[b]12 g/L for the first 68 m³/d; 6.6 g/L for the next 45 m³/d; 1.8 g/L for the rest.
[c]97% reduction in carbon exhaustion rate using PAC-SBR process.
[d]$1.65/kg carbon. All costs are in 1984 U.S. dollars.
SBR Treatment System - design TOC loading = 181 kg/d

TABLE 8-continued

Expected Saving in Treatment Cost with PAC-SBR Process

| average TOC loading = 173 kg/d | $/year |
|---|---|
| 1. Carbon saving | 693,700 |
| 2. Operating labor, misc. costs[a] | (0) |
| 3. Maintenance[a] | (50,000) |
| 4. Electrical power[b] | (20,000) |
| 5. Sludge disposal[c] | (25,000) |
| 6. Analytical[a] | (23,000) |
| 7. Nutrients and chemicals[d] | (4,600) |
| Net Saving | $571,000/year |

[a]Cost over the expanded adsorption operation required in the near future.
[b]$0.06/kWh.
[c]Total sludge production rate - 1.02 g/g TOC; dewatered sludge - 30% solid, disposal costs - $0.10/kg.
[d]Supplementing $NH_3$ and $H_3PO_4$ to a $TOC/N-NH_4/P-PO_4$ ratio of 150/10/2.

We claim:

1. The combination of physicochemical and biological treatment processes for removing dioxins, PCB's, and other halogenated organic compounds from raw wastewater, in a pretreatment zone to produce pretreated wastewater still containing minor proportions, of dioxins and PCB's and then in a reaction zone wherein final effluent is produced which comprises the physiocochemical process consisting of subjecting the raw wastewater to simultaneous neutralization and oxidation, followed by separating precipitated products, which precipitated products have adsorbed a major proportion of at least 90% of the dioxins and PCB's present in the raw wastewater in the same pretreatment zone, and then followed by biological treatment process consisting of subjecting the pre-treated wastewater, which contains the minor proportion of dioxins and PCB's, and other halogenated organic compounds in raw wastewater, to a combined powdered active carbon adsorption and biological treatment process in a sequencing batch reactor in the presence of acclimated activated sludge which comprises the steps FILL, REACT, SETTLE, DRAW, and IDLE, said combined treatment process operating at a mixed liquor suspended solids concentration in excess of 5000 mg/L, and wherein the amount of powdered active carbon is added during the FILL and/or REACT steps and is sufficient to produce a final effluent free of dioxins and PCB's, containing less than 0.8 ppt and less than 2.0 ppb, respectively, and substantially free of other halogenated organic compounds, and disposing of waste sludge in a secure landfill.

2. The process of claim 1 where in the powdered activated carbon is introduced during the FILL step.

3. The process of claim 1 wherein the powdered activated carbon is introduced during the REACT step.

4. The process of claim 1 wherein the wastewater is neutralized to a pH range of 6.5 and 8.5, and wherein the wastewater is oxidized until the chemical oxygen demand is satisfied.

5. The process of claim 4 wherein the precipitated products are separated by sedimentation, and wherein the sediments contain a major proportion of the dioxins and PCB and are disposed of in a secure landfill.

* * * * *